(12) United States Patent
Hoffman et al.

(10) Patent No.: US 6,483,444 B2
(45) Date of Patent: Nov. 19, 2002

(54) MULTIPORT COMMUNICATIONS ADAPTER

(75) Inventors: Russell E. Hoffman, Baden, PA (US); William D. Toole, Jr., Wexford, PA (US); Roy D. Houston, Bethel Park, PA (US)

(73) Assignee: Optimum Power Technology, Bridgeville, PA (US)

( * ) Notice: Subject to any disclaimer, the term of this patent is extended or adjusted under 35 U.S.C. 154(b) by 87 days.

(21) Appl. No.: 09/784,291

(22) Filed: Feb. 16, 2001

(65) Prior Publication Data

US 2002/0116559 A1 Aug. 22, 2002

(51) Int. Cl.[7] ............................................. G08G 1/123
(52) U.S. Cl. .................. 340/999; 340/531; 340/310.01; 340/310.06; 340/310.07
(58) Field of Search ................................. 340/999, 531, 340/310.01, 310.06, 310.07

(56) References Cited

PUBLICATIONS

<http://www.rad.com/networks/1995/rs232/rs449.htm>— "RS–422, RS–423, and RS–449—A Compatible Improvement of RS–232–C".

"+5V–Powered, Multichannel RS–232 Drivers/Receivers, MAX220–MAX249", *Maxim* (Maxim Integrated Products), 19–4323; Rev 9;5/00.
<http://www.dgtech.com/products/index.phtml>—"Dearborn Group, Inc. Product Index", Copyright 2000 Dearborn Group, Inc.
"Advance Information Automotive ISO 9141 Serial Link Driver, MC33199/D", Motorola Analog IC Device Data, Copyright 1995 Motorola, Inc.,.
"MC78LXXA/LM78LXXA 3 terminal 0.1A positive voltage regulator", Fairchild Semiconductor—*www.fairchildsemi.com*, Copyright 2000 Fairchild Semiconductor International.
<http:www.siliconegines–ltd.com/9141c.html>—"Silicon Engines ISO 9141–RS 232 Convertor".
<http://www.planetfall.com/~jeff/obdii/>—"Opendiag Schematics & PCB Layout", Copyright 2000 Jeff Noxon.
<http://www.efisystems.com/interacq.htm>—"Interacq Data Collection Software", "InterACQ for Windows User's Guide", pp. 1, 3, 33.
<http://www.rd–electronic.de/kwp_e_1.htm>—
"KWP2000 Measurement Functional Description".

*Primary Examiner*—Daryl Pope

(57) ABSTRACT

A multiport communications adapter which permits communication links with an electronic control unit from either a desktop/laptop personal computer or palmtop personal computer.

8 Claims, 2 Drawing Sheets

MULTIPORT COMMUNICATIONS ADAPTER

BACKGROUND OF THE INVENTION

1. Field of the Invention

The present invention relates to a multiport communications adapter, and more particularly, to a communications adapter capable of supporting different connector types of different communication protocols. Although the present invention is suitable for a wide scope of applications, it is particularly suitable for providing electrical communications between on-board electronic control units and external computers such as desktop/laptop or palmtop personal computers.

2. Description of the Related Art

Most modern vehicle systems, including both automobile and motorcycle systems, include multiple electronic control units (ECU's) for uploading and down-loading various data. For example, ECU's may be accessed to monitor and evaluated data representative of engine performance parameters, checking calibration data and serial number identification using an ISO-9141 protocol for uploading and down-loading data to a communications port of a laptop/desktop/palmtop personal computer. Currently, personal computers (PC's) are used for uploading and down-loaded data to provide both monitoring and control capabilities of the ECU's.

Since the late 1990's, handheld electronic devices, such as palmtop PC's, have become increasingly common. Palmtop PC's may be used for storing and analyzing data received from communication interfaces. Palmtop PC's typically have RS232 DCE interfaces with 9-pin female port connectors (often used for "syncing" with the desktop/laptop computer) so that male connectors must be provided to accommodate a communications interface port connector. Desktop/laptop PC's typically have 9-pin male RS232 DTE interfaces so that female connectors must be provided to accommodate certain interface port connectors. For example, with respect to the ISO-9141 communications protocol, because palmtop PC's and desktop/laptop PC's differ with respect to DTE versus DCE configurations, it is not possible to interchangeably connect a palmtop PC and a desktop/laptop PC to receive data from an ISO-9141 interface without using additional connectors and/or cables to accommodate the different connector and interface configurations.

Currently, there is a need to provide a multiport communications adaptor which accommodates both desktop/laptop and palmtop PC's without the need for any additional connectors and/or interconnecting cables when uploading or downloading data using specific communication protocols.

SUMMARY OF THE INVENTION

Accordingly, the present invention is directed to a multiport communications adapter having both DCE/female and DTE/male connector ports to overcome the problems associated with using multiple connectors and/or interconnecting cables due to incompatibilities between the different connector configurations of the different communication protocols.

One aspect of the present invention is to provide a communications adapter which allows a user to efficiently switch between a desktop/laptop PC and a palmtop PC when uploading or down-loading data using a specific protocol interface.

Another aspect of the present invention is to provide communication protocol conversion using a communications adapter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute part of this application, illustrate embodiments of the invention and together with the description serve to explain the principle of the invention.

In the drawings.

DETAILED DESCRIPTION OF THE PREFERRED EMBODIMENT

A multiport communications adapter device of the present invention will now be described with reference to FIGS. 1 and 2.

Figure 1:
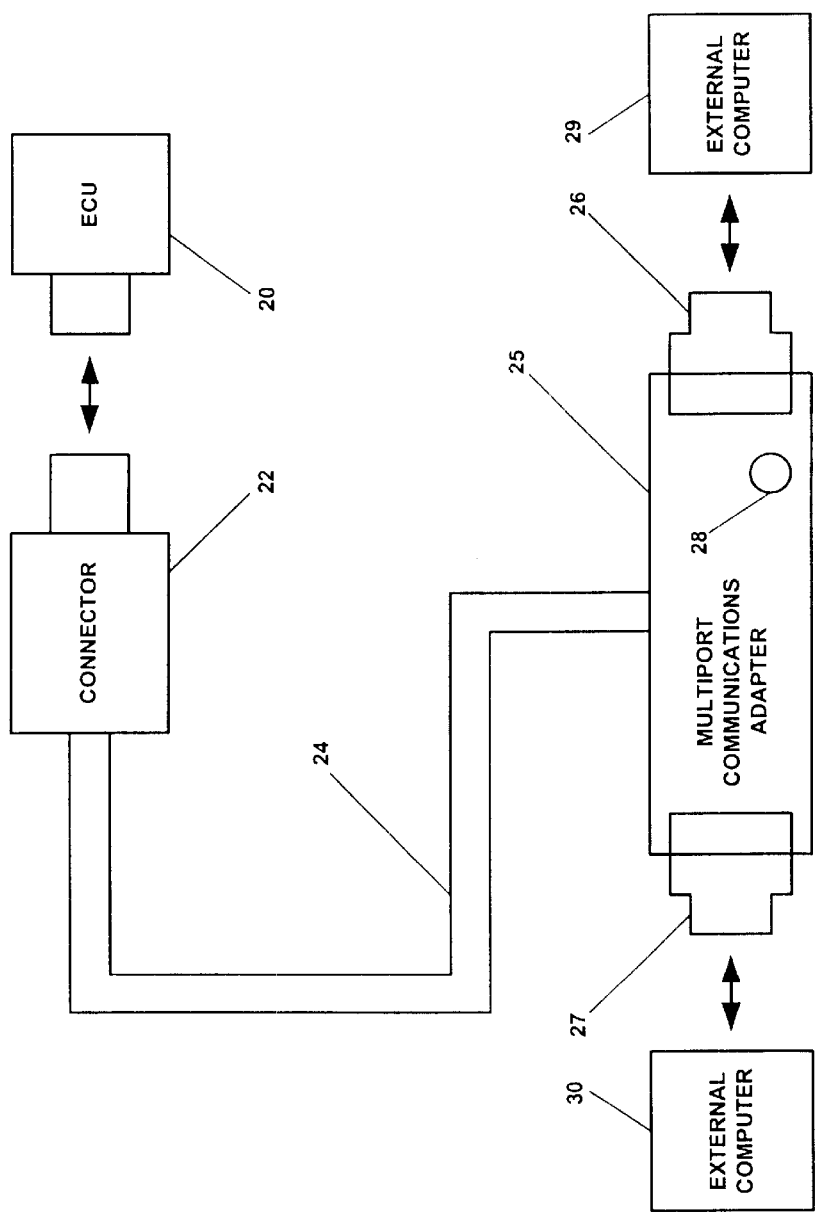
FIG. 1 is an interconnection plan layout of an exemplary serial communications adapter of the present invention between an ECU and external computers.

As shown in FIG. 1, a multiport communications adapter includes an adaptor body 25, a global female serial port connector 26, a global male serial port connector 27, an indicator display 28, an electrical line 24, and a connector 22. Each of the global female and male serial port connectors 26, 27 may be, for example, 9-pin connectors to provide communications to RS232 DCE/DTE interfaces. Of course, other connector technologies may be used in connection with the present invention. The global female serial port connector 26 and the global male serial port connector 27 may each individually be coupled to a corresponding mating connector of an external computer 29, 30 to establish a communications link. For example, the global female serial port connector 26 of the adaptor body 25 may be coupled to a compatible male serial port of a desktop/laptop computer 29 or the global male serial port connector 27 of the adaptor body 25 may be coupled to a compatible female serial port connector of a palmtop personal computer device 30. In this manner, the multiport communications adapter of the present invention may be used with either a desktop/laptop personal computer or with a palmtop personal computer, without the use of an additional adapter, connectors and/or interconnecting cables.

The electrical line 24 has a first end connected to components housed within the adapter body 25 and a second end connected to a connector 22. The electrical line 24 may be any suitable electrical path, such as a coaxial cable, ribbon cable, etc. and may include signal lines as well as power lines. The connector 22 may be a connector or any other suitable connector capable of providing direct electrical communications between ECU 20 and electronic circuitry contained within the adaptor body 25.

In an exemplary embodiment, electrical line 24 includes K-and L-lines in accordance with the ISO-9141 standard. As discussed more below, the K-line may be used for transmitting half-duplex data communications signals. The L-line may be used for transmitting "wake-up" signals to an ECU.

Figure 2:
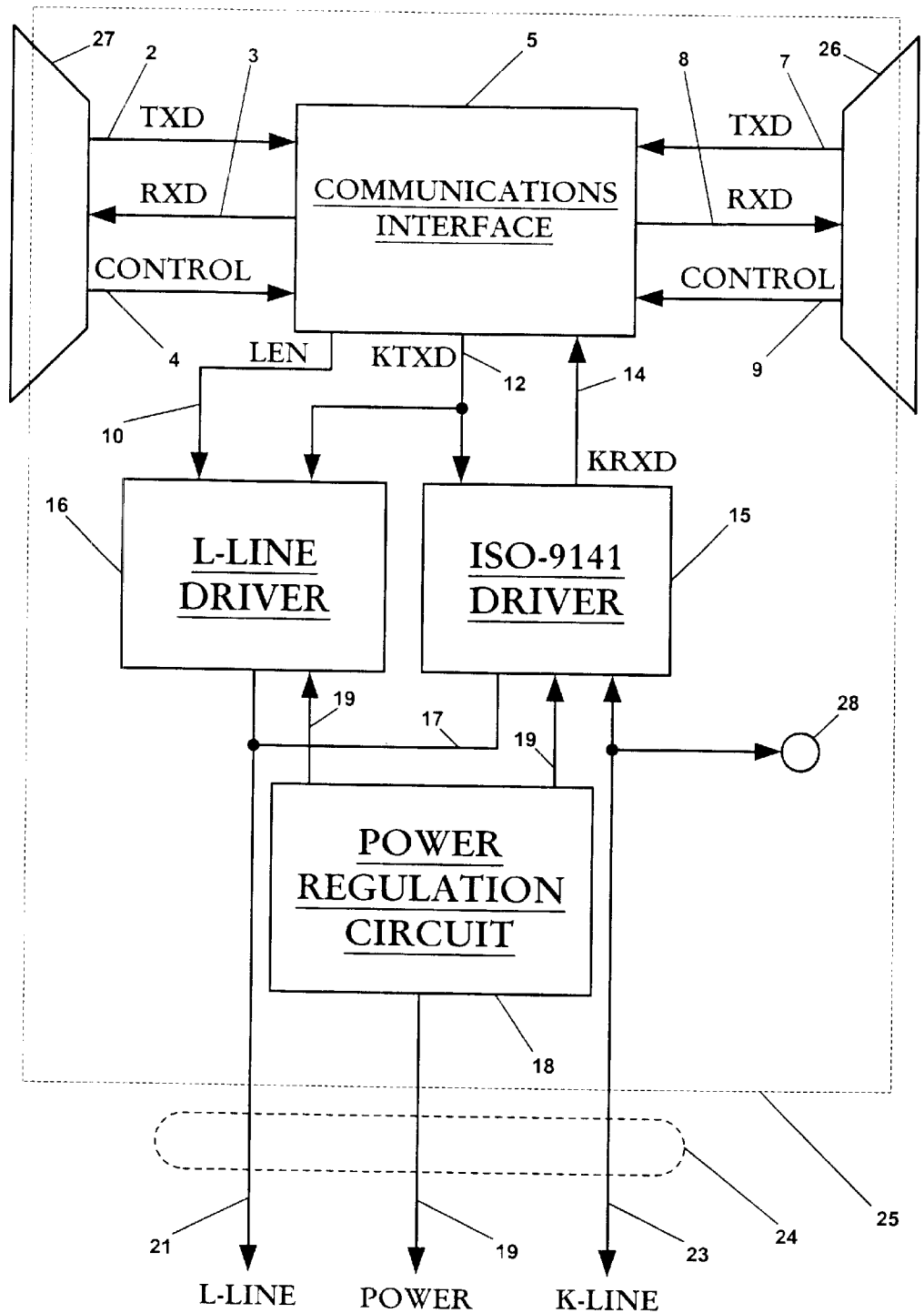
FIG. 2 is a schematic layout of an exemplary serial communications adapter body of the present invention.

FIG. 2 illustrates a first exemplary embodiment of electronic circuitry included in the serial communications adapter body 25. As shown in FIG. 2, adapter body 25 includes a communications interface 5, an L-line driver 16, an ISO-9141 driver 15, and a power regulation circuit 18.

Communications interface 5 is coupled to the global female serial port connector 26 and the global male serial port connector 27 and to the L-line driver 16 and the ISO-9141 driver 15. Communications interface 5 supports half duplex communications between the ECU 20 and external computers through either the global female serial port connector 26 or the global male serial port connector 27. Half duplex communications for the communications interface 5 are provided by the use of separate transmit (TXD) data lines 2, 7 and receive (RXD) data lines 3, 8 coupled to the connectors 26, 27. Control lines 4, 9 may also be provided for control of L-line transmission or handshaking lines and flow control.

Communications interface 5 and ISO-9141 driver 15 are coupled to transmit and receive electrical signals. For example, communications interface 5 may transmit data to ISO-9141 driver 15 over KTXD line 12 and receive data from ISO-9141 driver 15 over KRXD line 14. Communications interface 5 is also coupled to L-line driver 16 and may control the L-line driver output using control line 10 and KTXD line 12. In this regard, the KTXD line 12 may be commonly connected to the communications interface 5, the ISO-9141 driver 15, and the L-line driver 16.

In an exemplary embodiment, communications interface 5 may be an RS-232 interface. Of course, other transmission protocols, such as universal serial bus (USB), SCSI, and others, may be supported in addition or instead. Using an RS-232 interface as an example, control lines 4, 9 may include DTR lines. A diagnostic computer can control a handshaking line, such as a DTR line 4 or 9, independently under programmed control. The RS232 signal on DTR line 4, 9 may be used to generate a signal for LEN line 10. The communications interface 5 permits communications rates of, for example, 9,600-200,000 bits per second.

The ISO-9141 driver 15 may be used for serial automotive and motorcycle electronic communications. ISO-9141 driver 15 converts transmit signals received on KTXD line 12 from the communications interface 5 to signals compatible with the ECU 20 and outputs those signals on K-line 23. ISO-9141 driver 15 also converts signals received on K-line 23 from the ECU 20 to signals compatible with communications interface 5 and outputs those signals on KRXD line 14.

Any compatible signal protocol may be exchanged between communication interface 5 and ISO-9141 driver 15. For example, communications interface 5 and ISO-9141 driver 15 may exchange transistor-transistor logic (TTL) signals. Communications over K-line 23 may be half duplex communications. Moreover, K-line 23 may support one or more different communications rates. For example, a "low current" version may be rated to 50,000 bits per second and a "high-current" version may be rated to 230,000 bits per second. ISO-9141 driver 15 also receives an L-line 21 for receiving an L-line signal, which will be described further below. ISO-9141 driver 15 also incorporates overvoltage and overcurrent protection. For example, an L-line receiver of the ISO-9141 driver 15 may provide line protection for L-line 21.

The L-line driver 16 provides L-line driver and L-line driver enable circuitry. L-line driver 16 drives L-line 21 responsive to an LEN signal received on line 10 and the transmit signal on the KTXD line 12 from the communications interface 5. For example, L-line driver 16 may include a transistor arrangement forming a logical AND gate that only allows the L-line 21 to be driven when the diagnostic computer 29, 30 asserts TXD and DTR at the same time. The L-line may be used for slow "wake-up" signaling of no more than 5 bits per second.

The power regulation circuit 18 outputs a power source generated from the battery of the ECU 20, via conductive line 19, to the ISO-9141 DRIVER 15 and the L-line driver 16. The power regulation circuit 18 may include both overvoltage and reverse-voltage protection diode devices, both of which are commonly known and used in the art.

Each of the communications interface 5, the ISO-9141 driver 15, and the L-line driver 16 may be embodied as integrated circuits formed on a semiconductor chip. L-line driver 16 may be incorporated into any one, or both, of the communications interface 5 and/or ISO-9141 driver 15.

While the example above has been described in the context of ISO-9141 protocol, communication protocols other than ISO-9141 may be used in accordance with the present invention. For example, communication protocols including controller area network (CAN), J1850, J1708, KWP2000, DeviceNet, Honda, ISO 11992 and UBP may be used either individually or in combination with one another and/or in addition to the ISO-9141 protocol. These communication protocols may use the RS232 interface, for example, or other interfaces including RS423 and RS449. Furthermore, implementation of different communication protocols may dictate the number and type of specific electrical connectors used to provide electrical communications between the computer(s) and the ECU 20 and may dictate the specific communications interface(s) including multiple pin connectors, for example.

It will be apparent to those skilled in the art that various modifications and variations can be made without departing from the scope or spirit of the invention. Thus, it is intended that the present invention covers the modifications and variations of this invention provided they come within the scope of the appended claims and their equivalents. For example, the use of specific driver circuitry may or may not be necessary for all communication protocols implemented with the present invention.

What is claimed is:

1. A multiport communications adapter comprising:

an adapter body;

a first connector of a first type; and a second connector of a second type different from the first type;

a third connector;

driver circuitry provided in said adapter body and electrically connected to the third connector, the driver circuitry provides for communicating with an electronic control unit coupled to the third connector in accordance with a first communications protocol; and a communications interface provided in said adapter body and electrically coupled to the first and second connectors and the driver circuitry, said communications interface providing communications between a computer coupled to one of the first connector and the second connector, and the driver circuitry according to a second communications protocol different from the first communications protocol, whereby the computer communicates with the electronic control unit through one of the first connector and the second connector, the communications interface, the driver circuitry and the third connector.

2. The multiport communications adapter of claim 1, wherein the first connector comprises a first global female serial port connector and the second connector comprises a second global male serial port connector.

3. The multiport communications adapter of claim 2, wherein the first and second serial connectors are provided at opposite ends of the adapter body.

4. The multiport communications adapter of claim 1, wherein said driver circuitry drives a K-line coupled to the third connector and further comprising an indicator electrically connected to the K-line signal line.

5. The multiport communications adapter of claim 1, wherein said driver circuitry comprises an ISO-9141 driver circuit and an L-line driver circuit.

6. The multiport communications adapter of claim 5, wherein the ISO-9141 driver circuit includes an L-line receiver electrically connected to an L-line signal line connected between the L-line driver circuit and the third connector.

7. The multiport communications adapter of claim 5, wherein the communications interface comprises an RS-232 interface.

8. The multiport communications adapter of claim 1, wherein the communications interface comprises an RS-232 interface.

* * * * *